(12) United States Patent
Burton et al.

(10) Patent No.: US 10,295,653 B2
(45) Date of Patent: May 21, 2019

(54) MOVING TARGET INDICATION (MTI) SYSTEM

(71) Applicants: Dale E. Burton, Melbourne, FL (US); Stephen B. Duke, Satellite Beach, FL (US); Erich Mirabal, Malabar, FL (US); Steven J. Wheeler, Melbourne, FL (US)

(72) Inventors: Dale E. Burton, Melbourne, FL (US); Stephen B. Duke, Satellite Beach, FL (US); Erich Mirabal, Malabar, FL (US); Steven J. Wheeler, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 818 days.

(21) Appl. No.: 14/697,276

(22) Filed: Apr. 27, 2015

(65) Prior Publication Data
US 2016/0313440 A1    Oct. 27, 2016

(51) Int. Cl.
| | | |
|---|---|---|
| *G01S 7/00* | (2006.01) | |
| *G01S 13/00* | (2006.01) | |
| *G01S 15/00* | (2006.01) | |
| *G01S 7/292* | (2006.01) | |
| *G01S 13/89* | (2006.01) | |
| *G01S 13/52* | (2006.01) | |
| *G01S 13/58* | (2006.01) | |

(52) U.S. Cl.
CPC ............. *G01S 7/292* (2013.01); *G01S 13/52* (2013.01); *G01S 13/588* (2013.01); *G01S 13/89* (2013.01)

(58) Field of Classification Search
CPC ........ G01S 7/292; G01S 13/52; G01S 13/588; G01S 13/89
See application file for complete search history.

(56) References Cited

U.S. PATENT DOCUMENTS

| | | | |
|---|---|---|---|
| 4,222,050 A | 9/1980 | Kiuchi et al. | |
| 6,260,759 B1 | 7/2001 | Nguyen et al. | |
| 7,420,504 B1* | 9/2008 | Held | G01S 13/22 |
| | | | 342/134 |
| 7,616,149 B2 | 11/2009 | Powers et al. | |
| 7,642,953 B2* | 1/2010 | Cheng | G01S 7/003 |
| | | | 342/179 |
| 8,229,163 B2 | 7/2012 | Coleman et al. | |
| 9,921,308 B2* | 3/2018 | Palmer-Smith | G01S 13/89 |

(Continued)

*Primary Examiner* — Toan K Le
(74) *Attorney, Agent, or Firm* — Tarolli, Sundheim, Covell & Tummino LLP

(57) ABSTRACT

One embodiment of the invention includes moving target indication (MTI) system. The system includes an MTI data processor configured to receive time-sampled location indicators associated with an approximate location of a moving target in a geographic scene of interest and to generate a moving target indicator associated with the moving target based on the time-sampled location indicators. The system also includes an image integrator configured to receive the moving target indicator associated with the moving target, to receive geography data associated with the geographic scene of interest, and to integrate the moving target indicator into the geography data as a three-dimensional moving target indicator at an approximate geographic location of the moving target.

17 Claims, 6 Drawing Sheets

(56) References Cited

U.S. PATENT DOCUMENTS

| | | | |
|---|---|---|---|
| 2008/0158256 A1* | 7/2008 | Russell | G06T 7/32 |
| | | | 345/629 |
| 2009/0021423 A1* | 1/2009 | Cheng | G01S 7/003 |
| | | | 342/25 A |
| 2009/0087029 A1* | 4/2009 | Coleman | G06K 9/00208 |
| | | | 382/103 |
| 2009/0109082 A1* | 4/2009 | Rose | G01S 3/46 |
| | | | 342/89 |
| 2010/0157056 A1* | 6/2010 | Zohar | G01S 3/7864 |
| | | | 348/144 |
| 2011/0267221 A1 | 11/2011 | Brundick et al. | |
| 2014/0191900 A1* | 7/2014 | Uysal | G01S 13/9023 |
| | | | 342/25 B |
| 2014/0282035 A1* | 9/2014 | Murthy | G06F 3/0484 |
| | | | 715/738 |

* cited by examiner

MOVING TARGET INDICATION (MTI) SYSTEM

TECHNICAL FIELD

This disclosure relates generally to sensor systems, and specifically to a moving target indication (MTI) system.

BACKGROUND

Moving target indication (MTI) is a manner of detecting a moving target in a potentially large geographic region. In an MTI system, a moving target is detected based on multiple sensor scans of the geographic region, in which the moving target is detected amidst static features of the geographic region based on discerning characteristics of the moving target from surrounding noise. For example, a typical MTI system can implement a radar system to detect the moving target based on the Doppler effect, such that a sequence of radar pulses can experience a Doppler shift in response to the moving target changing a location with respect to the radar system. Thus, the moving target can be located based on position of the radar, the radar-pointing accuracy, as well as azimuth and range resolution. Detection of the moving target can thus allow tracking of the movement of the moving target, such as with respect to roads and/or with respect to relative locations of other moving targets.

SUMMARY

One embodiment of the invention includes moving target indication (MTI) system. The system includes an MTI data processor configured to receive time-sampled location indicators associated with an approximate location of a moving target in a geographic scene of interest and to generate a moving target indicator associated with the moving target based on the time-sampled location indicators. The system also includes an image integrator configured to receive the moving target indicator associated with the moving target, to receive geography data associated with the geographic scene of interest, and to integrate the moving target indicator into the geography data as a three-dimensional moving target indicator at an approximate geographic location of the moving target.

Another embodiment of the invention includes a computer readable medium configured to store instructions that, when executed, implement a method for providing moving target indication (MTI). The method includes receiving geography data associated with a geographic scene of interest, and receiving a plurality of time-sampled location indicators associated with an approximate location of a moving target in the geographic scene of interest at each of a respective plurality of sampling times. The method also includes assign each of the plurality of time-sampled location indicators a height relative to the approximate location of the moving target on the geographic scene of interest that corresponds to a separate one of the respective plurality of sampling times. The method also includes superimposing each of the plurality of time-sampled location indicators onto the geography data at the approximate location of the moving target in the geographic scene of interest and at the respective height associated with the respective one of the plurality of sampling times to provide a moving target indicator. The method further includes displaying the geographic scene of interest with the moving target indicator on a monitor.

Another embodiment of the invention includes moving target indication (MTI) system. The system includes an MTI data processor configured to receive time-sampled location indicators associated with an approximate location of a moving target in a geographic scene of interest at each of respective sampling times via a radar system and to generate a moving target indicator associated with the moving target based on the time-sampled location indicators. The moving target indicator includes a set of the time-sampled location indicators that each correspond to the approximate location of the moving target in the geographic scene of interest at each of the respective sampling times. The MTI data processor is configured to assign each of the set of the time-sampled location indicators associated with the moving target indicator a height relative to the approximate location of the moving target on the geographic scene of interest that corresponds to a separate one of the respective sampling times. The system also includes an image integrator configured to receive the moving target indicator associated with the moving target, to receive image data associated with the geographic scene of interest, and to superimpose the moving target indicator into the geography data as a three-dimensional moving target indicator at an approximate geographic location of the moving target. The system further includes a monitor configured to display the three-dimensional moving target indicator superimposed on the image data at the approximate geographic location of the moving target.

DETAILED DESCRIPTION

This disclosure relates generally to sensor systems, and specifically to a moving target indication (MTI) system. The MTI system is configured to provide three-dimensional moving target indicators to allow better distinction between different moving targets on a given map of a geographical area. The MTI system receives a time-sampled location indicators of at least one moving target in a geographic scene of interest, such as via a radar system, at each of respective sampling times. At a given sampling time, a moving target can be represented by a set of the time-sampled location indicators that can be represented as a three-dimensional moving target indicator of the moving target that is integrated with geography data of the geographic scene of interest to provide a visual indication of the moving target. For example, the set of the time-sampled location indicators that are each associated with a respective one of a plurality of sampling times can be associated with a height relative to the geographic scene of interest, such as in a temporally ascending or descending manner, to provide the three-dimensional moving target indicator. As an example, a most recent time-sampled location indicator corresponding to a most recent sampling time can be depicted in a manner that is distinct relative to the remaining time-sampled location indicators, such as being at least one of a different color and a different size.

Movement of the moving target can thus be tracked at each of the sampling times based on the creation of a new time-sampled location indicator corresponding to a location of the moving target at the respective sampling time, and based on the height of the previous time-sampled location indicators being adjusted to a height corresponding to a previous sampling time. In addition, the MTI system can also include a velocity calculator that is configured to calculate a velocity of the moving target based on the relative height of the plurality of time-sampled location indicators. As an example, the velocity calculator can determine a relative spacing of the time-sampled location indicators with respect to both height and distance, such as to plot a statistical graph having an associated slope. The associated slope can thus be indicative of the velocity of the moving target as a function of distance moved (based on the spacing between the time-sampled location indicators across the geographical scene of interest) and of time (based on the relative height of the time-sampled location indicators). As an example, the velocity calculator can be configured to allow a user to define a sampling window associated with a predetermined previous time duration to calculate the velocity of one or more moving targets during the sampling window based on the time-sampled location indicators stored in a memory and which are associated with the sampling window.

Figure 1:
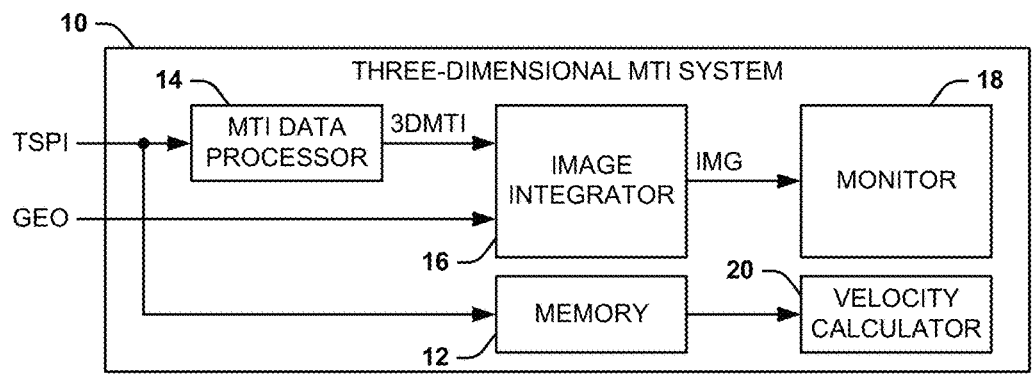
FIG. 1 illustrates an example of a three-dimensional MTI system.

FIG. 1 illustrates an example of a three-dimensional MTI system 10. The MTI system 10 can be implemented in a variety of applications, such as surveillance, reconnaissance, target-acquisition, and a variety of other applications to ascertain the location of a moving target in approximate real-time. The MTI system 10 is configured to receive time-sampled location indicators, demonstrated in the example of FIG. 1 as a signal TSPI, of one or more moving targets in a geographic scene of interest. As an example, the time-sampled location indicators TSPI can be collected via one or more sensor systems, such as a radar and/or a lidar system, on one or more moving platforms (e.g., an aircraft). In the example of FIG. 1, the time-sampled location indicators TSPI can be stored/buffered in a memory 12 associated with the MTI system 10. Additionally, the MTI system 10 receives geography data, demonstrated in the example of FIG. 1 as a signal GEO, associated with the geographic scene of interest. The geography data GEO can correspond to geographic, topographical, spatial, and/or navigation details regarding the geographic characteristics of the geographic scene of interest. For example, the geography data GEO can be image data, such as satellite or aerial imagery, or can be map data that is a graphical rendering of the geographic scene of interest, such as tied to a navigation program or application.

In the example of FIG. 1, the MTI system 10 includes an MTI data processor 14 that is configured to assign the time-sampled location indicators TSPI with respect to location and time, such as for each of at least one moving target, to generate a moving target indicator 3DMTI. As an example, the MTI data processor 14 can be configured to associate a set of the time-sampled location indicators TSPI associated with a respective plurality of the sampling times with a given one of the moving target(s) in the geographic scene of interest, such that the set of the time-sampled location indicators TSPI corresponds to a three-dimensional moving target indicator of the respective moving target. For example, the MTI data processor 14 can be configured to assign each of the time-sampled location indicators TSPI in a given set corresponding to a respective one of the moving target(s) a height that corresponds to a respective one of the sampling times, with the height being relative to the geographic region of interest. Thus, the set of time-sampled location indicators TSPI are provided as a histogram of previous sampling times corresponding to respective previous locations of the moving target, with the height of each of the time-sampled location indicators TSPI corresponding to a separate respective one of the recent sampling times.

As an example, the height can be relative to a predetermined two-dimensional plane associated with the geographic region of interest, a three-dimensional topography of the geographic region of interest (e.g., with respect to a given one of the set of time-sampled location indicators TSPI, and thus the three-dimensional moving target indicator), or a variety of other relative heights with respect to a three-dimensional extension of the three-dimensional moving target indicator from a surface of the geographic region of interest. In addition, the MTI data processor 14 can be configured to demonstrate motion of the moving target across multiple sampling times, as described in greater detail herein, by associating a new time-sampled location indicator TSPI of the moving target at a predetermined height associated with a most recent sampling time, and by moving previous time-sampled location indicators TSPI in the set to new heights associated with previous sampling times.

The MTI system 10 also includes an image integrator 16 that receives the moving target indicator 3DMTI from the MTI data processor 14 and receives the geography data GEO (e.g., from a camera or from a memory (e.g., the memory 12) configured to store a geographical or a topographical rendering of the geographic scene of interest). The image integrator 16 is thus configured to integrate the moving target indicator 3DMTI and the geography data GEO to generate a composite image IMG that is displayed on a monitor 18. The composite image IMG can thus include a graphical image of the geographic scene of interest with the moving target indicator 3DMTI superimposed onto the geographic scene of interest at a location that approximately corresponds to a location of the moving target in the geographic scene of interest. In addition, the MTI data processor 14 can be configured to update the moving target indicator 3DMTI at each of the sampling times, such that the location of the moving target indicator 3DMTI can be updated in approximate real-time to demonstrate approximate real-time updates to the location of the moving target in the geographic scene of interest. Therefore, a user of the MTI system 10 can track the location of the moving target in the geographic scene of interest in approximate real-time. Furthermore, as described herein, the moving target indicator 3DMTI is demonstrated three-dimensionally on the composite image IMG based on the moving target indicator 3DMTI being composed of the set of time-sampled location indicators TSPI corresponding respectively to the separate recent sampling times being demonstrated at separate respective heights with respect to the geographic scene of interest. Accordingly, the user can more easily identify the moving target in the geographic scene of interest, and can better distinguish the moving target from other moving targets that are proximal in location to the moving target based on each of the moving targets having separate respective three-dimensional moving target indicators 3DMTI on the composite image IMG.

Figure 2:
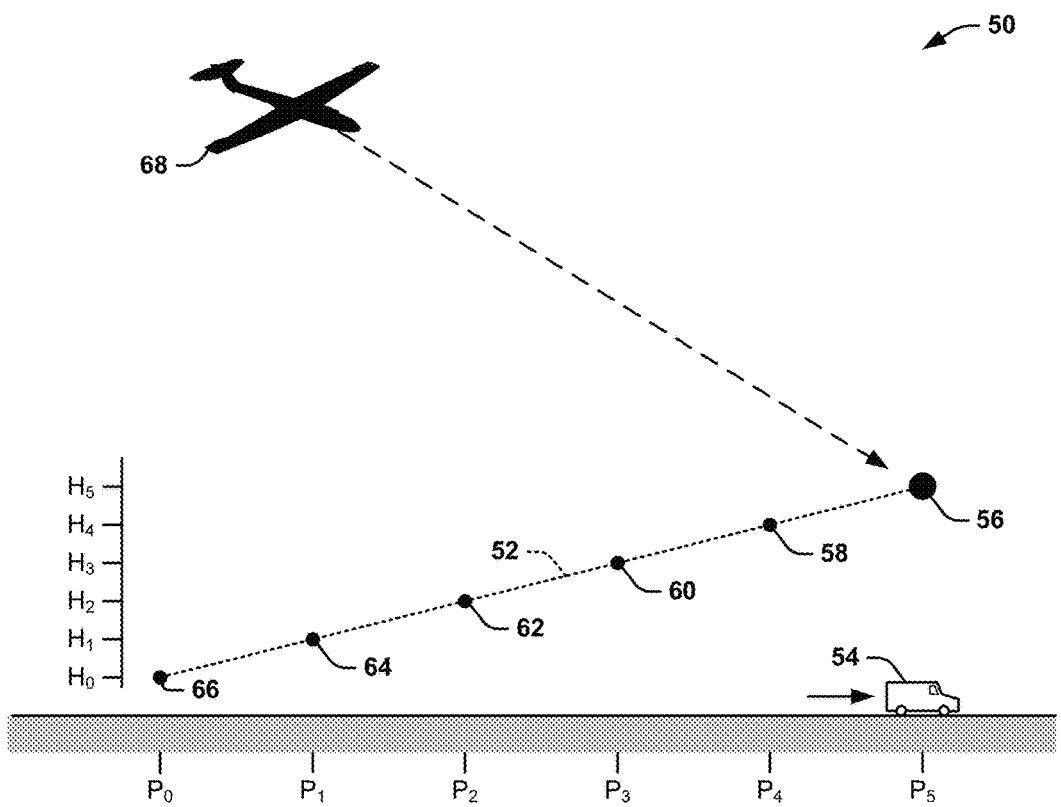
FIG. 2 illustrates an example diagram of a moving target indicator.

FIG. 2 illustrates an example diagram 50 of a moving target indicator 52. The moving target indicator 52 can correspond to a moving target indicator 3DMTI that can be generated by the MTI data processor 14. Therefore, reference is to be made to the example of FIG. 1 in the following description of the example of FIG. 2. The moving target indicator 52 is demonstrated in the example of FIG. 2 diagrammatically as a dashed line that interconnects a set of time-sampled location indicators that each correspond to a location of a moving target 54, demonstrated as a ground vehicle, at each of separate respective sampling times. The time-sampled location indicators are demonstrated as a first time-sampled location indicator 56, a second time-sampled location indicator 58, a third time-sampled location indicator 60, a fourth time-sampled location indicator 62, a fifth time-sampled location indicator 64, and a sixth time-sampled location indicator 66. Thus, the collective set of time-sampled location indicators 56, 58, 60, 62, 64, and 66 corresponds to the moving target indicator 52, such that the dashed line is merely demonstrative of the collective relationship of the set of time-sampled location indicators 56, 58, 60, 62, 64, and 66 with respect to the moving target indicator 52 as a whole.

In the example of FIG. 2, the moving target indicator 52 can correspond to an approximate geographic location of the moving target 54 at a single respective sampling time, as well as demonstrating previous locations of the moving target 54 at previous sampling times. Each of the time-sampled location indicators 56, 58, 60, 62, 64, and 66 can have been ascertained at separate respective sampling times based on a sensor system (e.g., a radar system) located on a platform 68, demonstrated in the example of FIG. 2 as an aerial vehicle. Alternatively, the platform 68 can be a stationary platform, such as located on elevated terrain, or can be a satellite system, or a variety of other types of moving or non-moving platforms. As an example, the MTI system 10 in the example of FIG. 1 can be located on the platform 68, or can be provided at a separate location, such that the time-sampled location indicators 54 can be communicated (e.g., wirelessly) to the MTI system 10 at the separate location.

In the example of FIG. 2, the moving target 54 is demonstrated at a location $P_5$, as ascertained by the sensor system of the platform 68 at a most recent sampling time. Therefore, the MTI data processor 14 can associate the first time-sampled location indicator 56 with the location $P_5$, the approximate location of the moving target 54 in the geographic scene of interest, at a height $H_5$ that corresponds to the most recent sampling time. In the example of FIG. 2, the first time-sampled location indicator 56 is demonstrated as larger than the other time-sampled location indicators 58, 60, 62, 64, and 66. As an example, the MTI data processor 14 can be configured to provide the time-sampled location indicator corresponding to the most recent sampling time in a different manner than the other time-sampled location indicators in a given set, such as being a different size and/or color. As a result, the time-sampled location indicator corresponding to the most recent sampling time (e.g., the time-sampled location indicator 56) can be indicated in the different manner in the composite image IMG relative to the other time-sampled location indicators in a set that collectively correspond to the moving target indicator (e.g., the moving target indicator 52) for easier identification by the respective user of the MTI system 10.

In addition, the diagram 50 demonstrates the second time-sampled location indicator 58 being associated with a location $P_4$ at a height $H_4$. The location $P_4$ can correspond to the location of the moving target 54 in the geographic scene of interest, and the height $H_4$ can correspond to a next most recent sampling time, such thus the immediately preceding sampling time. Thus, at the immediately preceding sampling time, the moving target 54 was located at approximately the location $P_4$ in the geographic scene of interest, and the MTI data processor 14 can have associated the second time-sampled location indicator 58 at the height $H_5$ during the immediately preceding sampling time. The MTI data processor 14 can have repositioned the second time-sampled location indicator 58 from the height $H_5$ to the height $H_4$ in the most recent sampling time, such that the height $H_4$ can thus correspond to the immediately preceding sampling time. As described herein, the term "reposition" with respect to a given one or more time-sampled location indicators from one sampling time to a next sampling time describes associating a different height to the respective time-sampled location indicators, such as in the memory 12 (e.g., via a software tag or pointer), such that the respective time-sampled location indicators can appear to have a different height in three-dimensional space on the composite image IMG. Therefore, the consecutive first and second time-sampled location indicators 56 and 58 can have heights that correspond to consecutive respective sampling times, and can have locations that correspond to consecutive approximate locations of the moving target 54 at the consecutive respective sampling times.

Similarly, the diagram 50 demonstrates the third time-sampled location indicator 60 being associated with a location $P_3$ at a height $H_3$, the fourth time-sampled location indicator 62 being associated with a location $P_2$ at a height $H_2$, the fifth time-sampled location indicator 64 being associated with a location $P_1$ at a height $H_1$, and the sixth time-sampled location indicator 66 being associated with a location $P_0$ at a height $H_0$. Therefore, the locations $P_3$ through $P_0$ can correspond to locations of the moving target 54 in the geographic scene of interest at separate respective consecutive sampling times, and the heights $H_3$ through $H_0$ can correspond to the consecutive sampling times in a time-aligned manner. Thus, the height $H_3$ corresponds to a sampling time that was two previous sampling times ago, the height $H_2$ corresponds to a sampling time that was three previous sampling times ago, the height $H_1$ corresponds to a sampling time that was four previous sampling times ago, and the height $H_0$ corresponds to a sampling time that was five previous sampling times ago, all with respect to the most recent sampling time corresponding to the moving target indicator 52. Therefore, the moving target indicator 52 is collectively represented by the set of time-sampled location indicators 56, 58, 60, 62, 64, and 66, such that, in the example of FIG. 2, the moving target indicator 52 is indicative of the most recent approximate location of the moving target 54 at the most recent sampling time and of the previous five approximate locations of the moving target 54 at the five previous consecutive sampling times. Because the heights $H_5$ through $H_0$ of the time-sampled location indicators 56, 58, 60, 62, 64, and 66 each correspond to separate respective consecutive sampling times, the moving target indicator 52 is three-dimensional, such as superimposed onto the geography data GEO and displayed on the composite image IMG, the moving target indicator 52 is demonstrative of both a current approximate location of the moving target 54 and a recent history of the location of the moving target 54 in a manner that is easy to identify by a user of the MTI system 10.

FIGS. 3-8 illustrate an example of generating a moving target indicator. The moving target indicator that is generated in the examples of FIGS. 3-8 can correspond to the moving target indicator 52 in the example of FIG. 2.

Therefore, reference is to be made to the example of FIG. 2 in the following description of the example of FIGS. 3-8.

Figure 3:
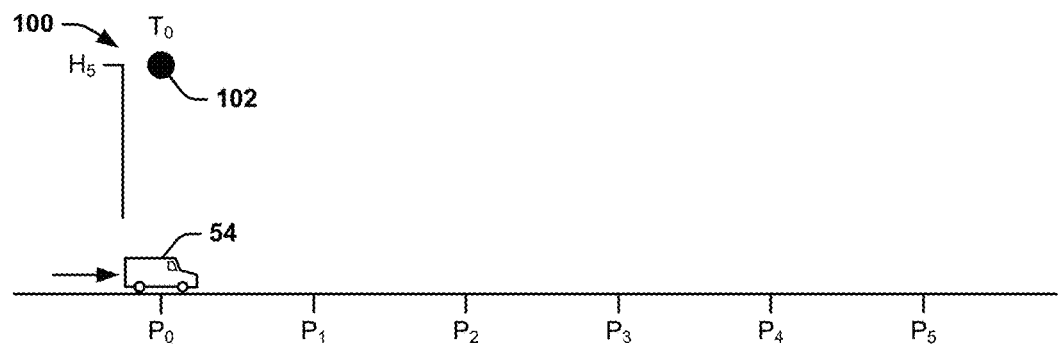
FIGS. 3-8 illustrate an example of generating a moving target indicator.

FIG. 3 demonstrates a diagram 100 that corresponds to a sampling time $T_0$, during which time the moving target 54 is located at the location $P_0$. Thus, a sensor system of the platform 68 determines that the moving target 54 is approximately located at the location $P_0$ (e.g., based on radar pulses), such that the MTI data processor 14 associates a time-sampled location indicator 102 with the location $P_0$, the approximate location of the moving target 54 in the geographic scene of interest, at the most recent sampling time $T_0$. The time-sampled location indicator 102 can be provided by the MTI data processor 14 in a manner that is distinct from other time-sampled location indicators (not shown in the example of FIG. 3), such as at a different color and/or larger, and is provided at a height $H_5$, because the time-sampled location indicator 102 corresponds to the most recent sampling time $T_0$.

Figure 4:
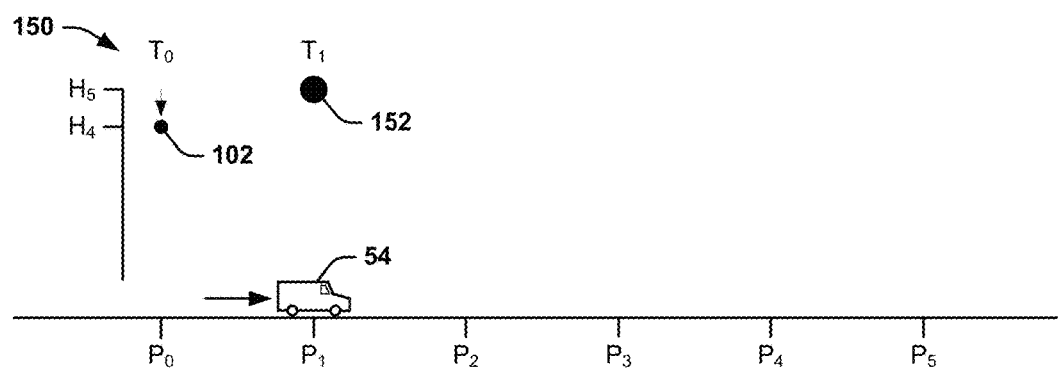

FIG. 4 demonstrates a diagram 150 that corresponds to a sampling time $T_1$ subsequent to the time $T_0$, during which time the moving target 54 has moved from the location $P_0$ to a new location $P_1$. Thus, the sensor system of the platform 68 determines that the moving target 54 is approximately located at the location $P_1$, such that the MTI data processor 14 associates a time-sampled location indicator 152 with the location $P_1$, the approximate location of the moving target 54 in the geographic scene of interest, at the most recent sampling time $T_1$. In addition, the MTI data processor 14 can reposition the height of the time-sampled location indicator 102 associated with the immediately preceding sampling time from the height $H_5$ to the height $H_4$ (such as in the memory 12), thus indicating that the time-sampled location indicator 152 corresponds to the most recent sampling time $T_1$ and that the time-sampled location indicator 102 corresponds to the immediately preceding sampling time $T_0$. Similar to as described previously, the time-sampled location indicator 152 can be provided by the MTI data processor 14 in a manner that is distinct from other time-sampled location indicator 102 and other time-sampled location indicators (not shown in the example of FIG. 4), such as at a different color and/or larger.

Figure 5:
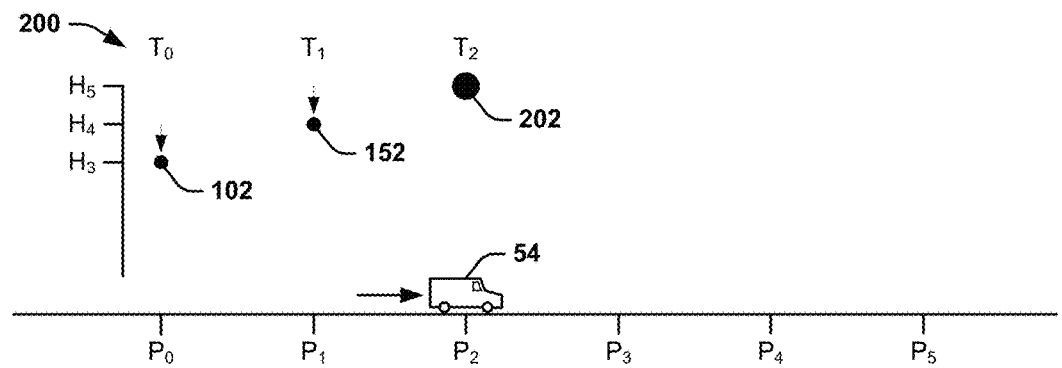

FIG. 5 demonstrates a diagram 200 that corresponds to a sampling time $T_2$ subsequent to the time $T_1$, such as at a sampling interval that is approximately equal to a time duration from the time $T_0$ to the time $T_1$. At the time $T_2$, the moving target 54 has moved from the location $P_1$ to a new location $P_2$. Thus, the sensor system of the platform 68 determines that the moving target 54 is approximately located at the location $P_2$, such that the MTI data processor 14 associates a time-sampled location indicator 202 with the location $P_2$, the approximate location of the moving target 54 in the geographic scene of interest, at the most recent sampling time $T_2$. In addition, the MTI data processor 14 can reposition the height of the time-sampled location indicator 152 associated with the immediately preceding sampling time $T_1$ from the height $H_5$ to the height $H_4$, and can reposition the height of the time-sampled location indicator 102 associated with the previous sampling time $T_0$ from the height $H_4$ to the height $H_3$ (such as in the memory 12). Thus, respective heights of the time-sampled location indicators 202, 152, and 102 indicate that the time-sampled location indicator 202 corresponds to the most recent sampling time $T_2$, the time-sampled location indicator 152 corresponds to the immediately preceding sampling time $T_1$, and the time-sampled location indicator 102 corresponds to the previous sampling time $T_0$. Similar to as described previously, the time-sampled location indicator 202 can be provided by the MTI data processor 14 in a manner that is distinct from other time-sampled location indicators 152 and 102 and other time-sampled location indicators (not shown in the example of FIG. 5), such as at a different color and/or larger.

Figure 6:
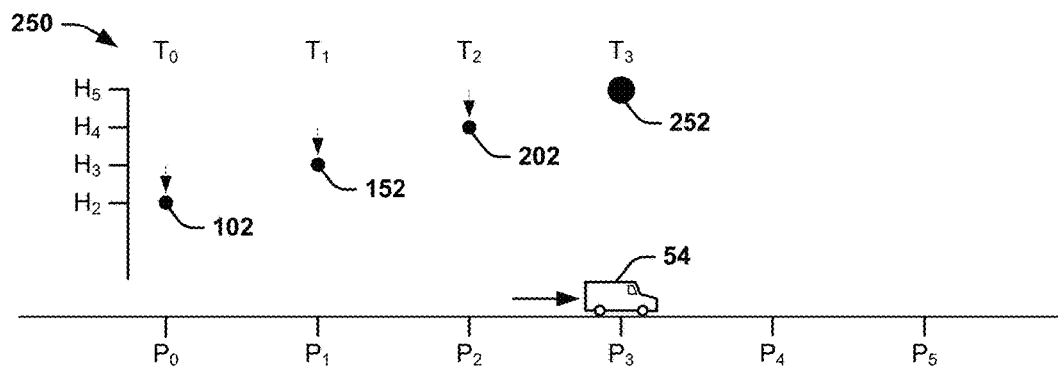

FIG. 6 demonstrates a diagram 250 that corresponds to a sampling time $T_3$ subsequent to the time $T_2$, such as at a sampling interval that is approximately equal to a time duration between the times $T_0$ and $T_1$ and times $T_1$ and $T_2$, which can be equal. At the time $T_3$, the moving target 54 has moved from the location $P_2$ to a new location $P_3$. Thus, the sensor system of the platform 68 determines that the moving target 54 is approximately located at the location $P_3$, such that the MTI data processor 14 associates a time-sampled location indicator 252 with the location $P_3$, the approximate location of the moving target 54 in the geographic scene of interest, at the most recent sampling time $T_3$. In addition, the MTI data processor 14 can reposition the height of the time-sampled location indicator 202 associated with the immediately preceding sampling time $T_2$ from the height $H_5$ to the height $H_4$, and can reposition the height of the time-sampled location indicators 152 and 102 associated with previous sampling times $T_1$ and $T_0$, respectively, from the height $H_4$ to the height $H_3$ and from the height $H_3$ to the height $H_2$, respectively (such as in the memory 12). Thus, respective heights of the time-sampled location indicators 252, 202, 152, and 102 indicate that the time-sampled location indicator 252 corresponds to the most recent sampling time $T_3$, the time-sampled location indicator 202 corresponds to the immediately preceding sampling time $T_2$, and the time-sampled location indicators 152 and 102 correspond to the previous sampling times $T_1$ and $T_0$, respectively. Similar to as described previously, the time-sampled location indicator 252 can be provided by the MTI data processor 14 in a manner that is distinct from other time-sampled location indicators 202, 152, and 102 and other time-sampled location indicators (not shown in the example of FIG. 6), such as at a different color and/or larger.

Figure 7:
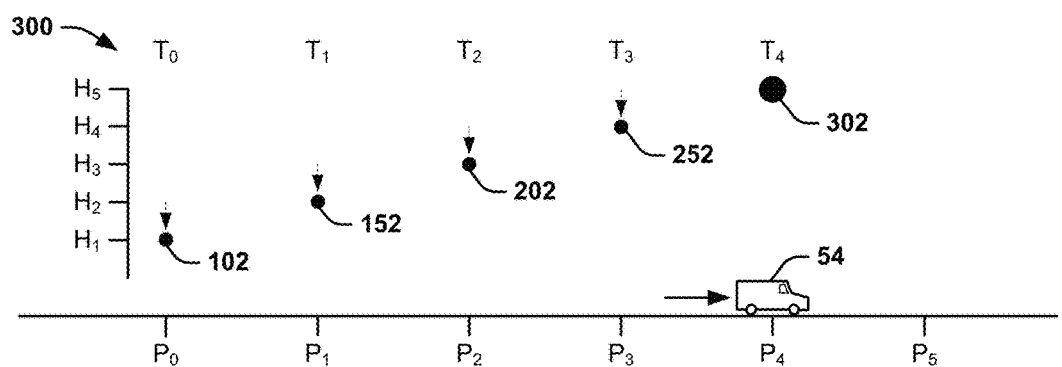

FIG. 7 demonstrates a diagram 300 that corresponds to a sampling time $T_4$ subsequent to the time $T_3$, such as at a sampling interval that is approximately equal to a time duration between the times $T_0$ and $T_1$, the times $T_1$ and $T_2$, and the times $T_2$ and $T_3$, which can all be equal. At the time $T_4$, the moving target 54 has moved from the location $P_3$ to a new location $P_4$. Thus, the sensor system of the platform 68 determines that the moving target 54 is approximately located at the location $P_4$, such that the MTI data processor 14 associates a time-sampled location indicator 302 with the location $P_4$, the approximate location of the moving target 54 in the geographic scene of interest, at the most recent sampling time $T_4$. In addition, the MTI data processor 14 can reposition the height of the time-sampled location indicator 252 associated with the immediately preceding sampling time $T_3$ from the height $H_5$ to the height $H_4$, and can reposition the height of the time-sampled location indicators 202, 152, and 102 associated with previous sampling times $T_2$, $T_1$, and $T_0$, respectively, from the height $H_4$ to the height $H_3$, from the height $H_3$ to the height $H_2$, and from the height $H_2$ to the height $H_1$, respectively (such as in the memory 12). Thus, respective heights of the time-sampled location indicators 302, 252, 202, 152, and 102 indicate that the time-sampled location indicator 302 corresponds to the most recent sampling time $T_4$, the time-sampled location indicator 252 corresponds to the immediately preceding sampling time $T_3$, and the time-sampled location indicators 202, 152, and 102 correspond to the previous sampling times $T_2$, $T_1$, and $T_0$, respectively. Similar to as described previously, the time-sampled location indicator 302 can be provided by the MTI data processor 14 in a manner that is distinct from other time-sampled location indicators 252, 202, 152, and 102 and other time-sampled location indicators (not shown in the example of FIG. 7), such as at a different color and/or larger.

Figure 8:
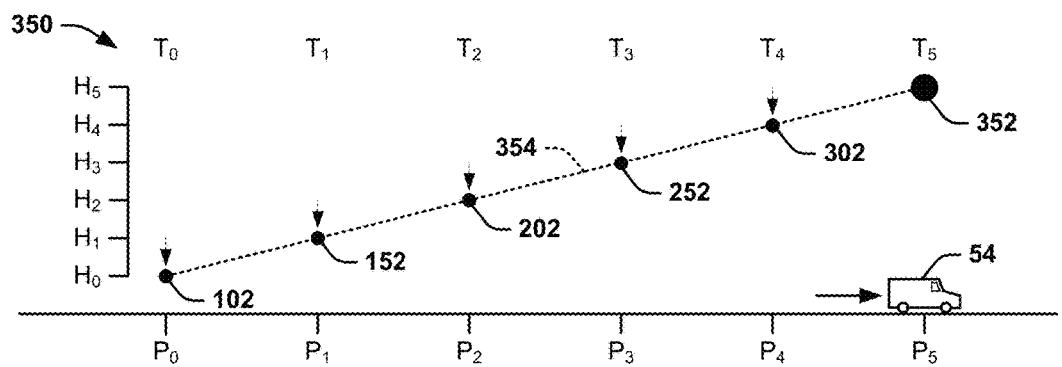

FIG. 8 demonstrates a diagram 350 that corresponds to a sampling time $T_5$ subsequent to the time $T_4$, such as at a sampling interval that is approximately equal to a time duration between the times $T_0$ and $T_1$, the times $T_1$ and $T_2$, the times $T_2$ and $T_3$, and the times $T_3$ and $T_4$, which can all be equal. At the time $T_5$, the moving target 54 has moved from the location $P_4$ to a new location $P_5$. Thus, the sensor system of the platform 68 determines that the moving target 54 is approximately located at the location $P_5$, such that the MTI data processor 14 associates a time-sampled location indicator 352 with the location $P_5$, the approximate location of the moving target 54 in the geographic scene of interest, at the most recent sampling time $T_5$. In addition, the MTI data processor 14 can reposition the height of the time-sampled location indicator 302 associated with the immediately preceding sampling time $T_4$ from the height $H_5$ to the height $H_4$, and can reposition the height of the time-sampled location indicators 252, 202, 152, and 102 associated with previous sampling times $T_3$, $T_2$, $T_1$, and $T_0$, respectively, from the height $H_4$ to the height $H_3$, from the height $H_3$ to the height $H_2$, from the height $H_2$ to the height $H_1$, and from the height $H_1$ to the height $H_0$, respectively (such as in the memory 12). Thus, respective heights of the time-sampled location indicators 352, 302, 252, 202, 152, and 102 indicate that the time-sampled location indicator 352 corresponds to the most recent sampling time $T_5$, the time-sampled location indicator 252 corresponds to the immediately preceding sampling time $T_4$, and the time-sampled location indicators 252, 202, 152, and 102 correspond to the previous sampling times $T_3$, $T_2$, $T_1$, and $T_0$, respectively. Similar to as described previously, the time-sampled location indicator 352 can be provided by the MTI data processor 14 in a manner that is distinct from other time-sampled location indicators 302, 252, 202, 152, and 102 and other time-sampled location indicators (not shown in the example of FIG. 8), such as at a different color and/or larger.

Therefore, the time-sampled location indicators 352, 302, 252, 202, 152, and 102 collectively correspond to a moving target indicator 354 (e.g., equivalent to the moving target indicator 52 in example of FIG. 2) of the moving target 54 that can be represented three-dimensionally in the composite image IMG based on the respective heights $H_5$, $H_4$, $H_3$, $H_2$, $H_1$, and $H_0$ of the time-sampled location indicators 352, 302, 252, 202, 152, and 102. As an example, the moving target 54 can continue moving, and the MTI data processor 14 can continue to associate a time-sampled location indicator with an approximate location of the moving target 54 at a most recent sampling time, can reposition the other time-sampled location indicators with respect to height, and can remove a last time-sampled location indicator of the moving target indicator 354 corresponding to a most previous sampling time. As a result, the MTI data processor 14 can adjust the moving target indicator 354 at each sampling time, such that the moving target indicator demonstrates motion of the moving target 54 on the composite image IMG, as visible by a user.

In the example of FIG. 2, the moving target indicator 52 is demonstrated based on the time-sampled location indicators 56, 58, 60, 62, 64, and 66 descending with respect to most recent to most previous sampling time. Similarly, the moving target indicator 354 in the examples of FIGS. 3-8 is demonstrated based on the time-sampled location indicators 352, 302, 252, 202, 152, and 102 descending with respect to most recent to most previous sampling time. Therefore, the moving target indicators 52 and 354 can be three-dimensionally demonstrated on the composite image IMG to users of the MTI system 10. As a result, multiple moving targets that are close in proximity in the geographic scene of interest can be discernible from each other based on the respective three-dimensional moving target indicators that represent them on the composite image IMG. While the moving target indicators 52 and 354 are demonstrated as descending with respect to most recent to most previous sampling time, it is to be understood that the moving target indicators 52 and 354 can instead be represented in a different manner, such as ascending with respect to most recent to most previous sampling time, or in any of a variety of other ways of associating height to sampling time.

Figure 9:
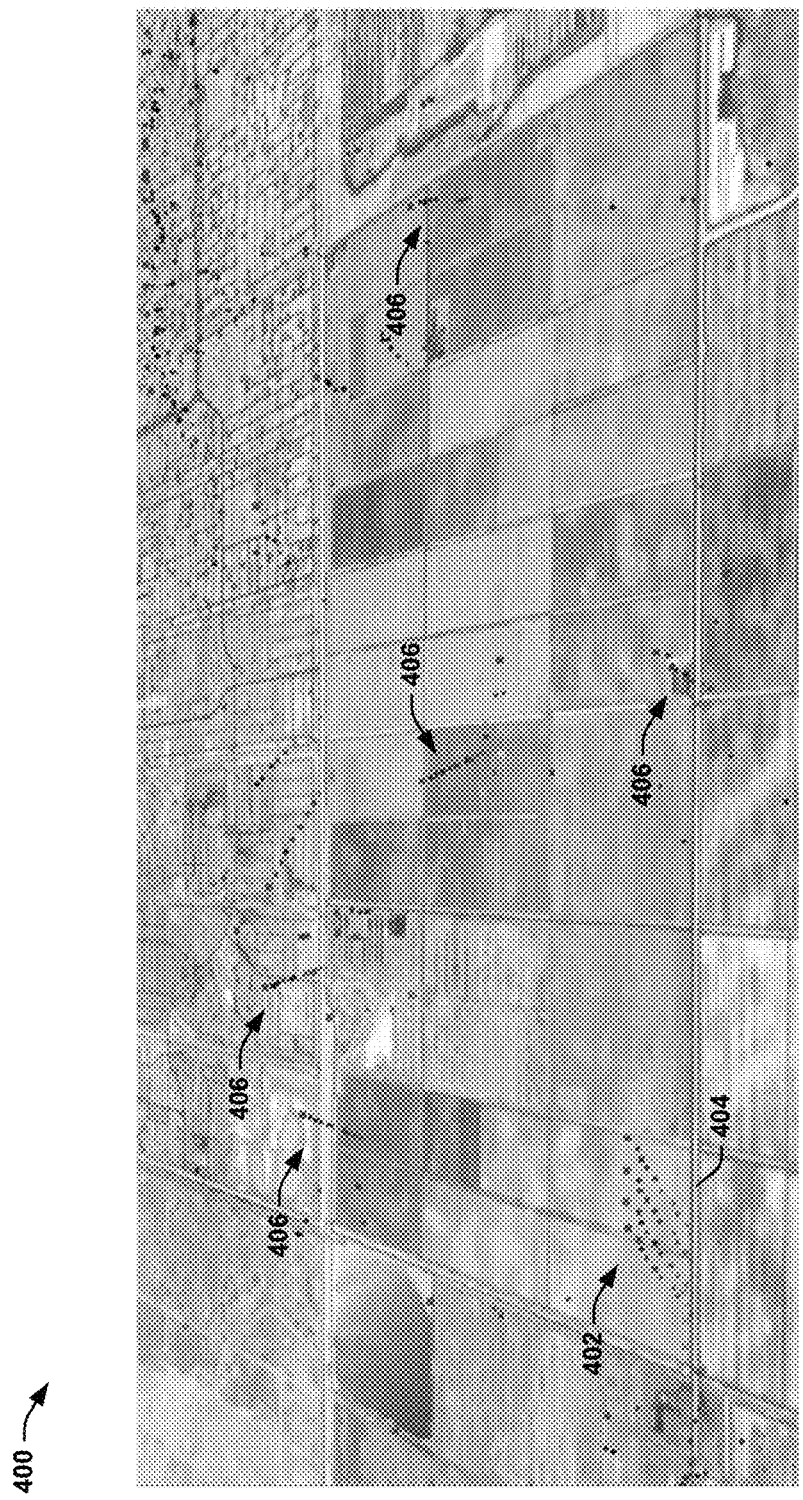
FIG. 9 illustrates an example of a three-dimensional composite image of a geographic scene of interest.

FIG. 9 illustrates an example of a three-dimensional composite image 400 of a geographic scene of interest. The composite image 400 can correspond to a composite image IMG that is generated by the image integrator 16 in the example of FIG. 1. Therefore, the composite image 400 can be composed of three-dimensional moving target indicators 3DMTI that are superimposed onto geography data GEO. In the example of FIG. 9, the geography data GEO can correspond to image data that is captured at high resolution by an aerial platform (e.g., an aircraft) at a substantially high altitude to facilitate viewing of a large geographic scene of interest.

The composite image 400 demonstrates a plurality of three-dimensional moving target indicators. In the example of FIG. 9, the composite image 400 includes a group of moving target indicators 402, demonstrated as four moving target indicators that are traveling together in relative close proximity along a road 404 at approximately the same speed (as indicated by a relative slope of the moving target indicators 402, as described in greater detail herein). Thus, the moving targets that are represented by the moving target indicators 402 can be road vehicles (e.g., cars, trucks, etc.). Because the moving target indicators 402 are located in relatively close proximity with respect to each other, the three-dimensional representation of the moving target indicators 402 in the composite image 400 allows a user to be able to distinguish the moving target indicators 402 from each other as they move along the road 404 in the geographic scene of interest. By contrast, a typical MTI system that only demonstrates moving target indicators in two-dimensions with respect to the geographic scene of interest would demonstrate the four distinct moving targets as a stream of time-sampled location indicators arranged on the road in the composite image IMG, such that time-sampled location indicators would blend in with each other and make it difficult or impossible for a user to determine how many moving targets would be in the grouping of the time-sampled location indicators, and would make it difficult to distinguish one moving target from another. However, because the time-sampled location indicators of each of the moving target indicators 402 are associated by the MTI data processor 14 to have separate respective heights with respect to the geography data GEO, the moving target indicators 402 are easily discernible to a user, thus allowing a user to easily distinguish the moving targets relative to each other.

The composite image 400 also includes a plurality of moving target indicators 406 that are approximately located in separate respective agricultural fields in the geographic scene of interest. The moving target indicators 406 are demonstrated as having a greater slope than the moving target indicators 402, and are thus demonstrated as moving slower than the moving target indicators 402. As an example, the moving target indicators 406 can correspond to tractors in the agricultural fields. The composite image 400 also includes a variety of other moving target indicators, such that the moving target indicators 402 and 406 are specific examples from many in the composite image 400.

Referring back to the example of FIG. 1, the MTI system 10 also includes a velocity calculator 20 that is configured to calculate a velocity of one or more of the moving targets in the geographic scene of interest. The velocity calculator 20 can be, for example, a program that can be operated by a user of the MTI system 10, such as via a graphical user interface (GUI), and/or can be implemented automatically by the MTI system 10 in response to the association of the time-sampled location indicators to respective heights by the MTI data processor 14. As described previously, the set of time-sampled location indicators TSPI of a given moving target are provided as a histogram of previous sampling times corresponding to respective previous locations of the moving target, with the height of each of the time-sampled location indicators TSPI corresponding to a separate respective one of the recent sampling times. Therefore, the moving target indicator 3DMTI associated with a given moving target is associated with time and distance (e.g., as a difference in location at each sampling time). Therefore, the velocity calculator 20 is configured to calculate a velocity of a given moving target based on a difference between consecutive respective time-sampled location indicators of the moving target with respect to the height and with respect to the location of the moving target. In the example of FIG. 1, the velocity calculator 20 can access the set of time-sampled location indicators TSPI from the memory 12 to calculate the velocity of the moving target based on the respective locations and heights with which the set of time-sampled location indicators TSPI of the moving target are associated.

As an example, the velocity calculator 20 can be configured to generate a graph of a statistical line of distance moved of the moving target relative to time based on the set of time-sampled location indicators TSPI. As described herein, the term "statistical line" refers to an abstraction of connecting a set of time-sampled location indicators associated with a given moving target to generate a statistical plot of distance as a function of time for ease of explanation herein. Thus, the velocity calculator 20 can simply perform mathematical differences between each of the time-sampled location indicators in a given set over time, such that the velocity calculator 20 may not actually plot a graph of a line and calculate slope of an actual statistically graphed line. The statistical line can thus correspond to the dashed line 52 that is representative of the moving target indicator 52 in the example of FIG. 2. The velocity calculator 20 can thus calculate a difference between the consecutive ones of the respective set of the time-sampled location indicators with respect to the height (e.g., the heights $H_0$ through $H_5$) and with respect to the location of the moving target (e.g., the locations $P_0$ through $P_5$) and to calculate the velocity of the moving target based on a slope of the statistical line. As an example, the velocity calculator 20 can be configured to calculate the velocity of each of the moving targets in the composite image IMG in approximate real-time, such as updating the velocity at each sampling time (e.g., via a statistical integration algorithm). As an example, the user can be able to select a given moving target on the composite image IMG (e.g., via the GUI), such that the velocity calculator 20 can provide the calculated speed (e.g., graphically) on the composite image.

As an example, the memory 12 can be configured to store the time-sampled location indicators associated with a plurality of moving targets, such as all of the moving targets in the geographic scene of interest for which the time-sampled location indicators are obtained via the sensor system. Thus, the velocity calculator 20 can be configured to calculate a relative velocity of each of the moving targets in the geographic scene of interest based on the time-sampled location indicators associated with each of the moving targets. Additionally, the memory 12 can store time-sampled location indicators associated with the moving target(s) over a large duration of time, such that the velocity calculator 20 can be configured to retroactively calculate a velocity of a moving target from a previous time duration as well as in substantial real-time (e.g., at each sampling time). For example, the velocity calculator 20 can be configured to enable a user to define a sampling window associated with a predetermined previous time duration to calculate the velocity of the moving target(s) during the sampling window based on the time-sampled location indicators stored in the memory 12 that are associated with the time defined by the sampling window.

Figure 10:
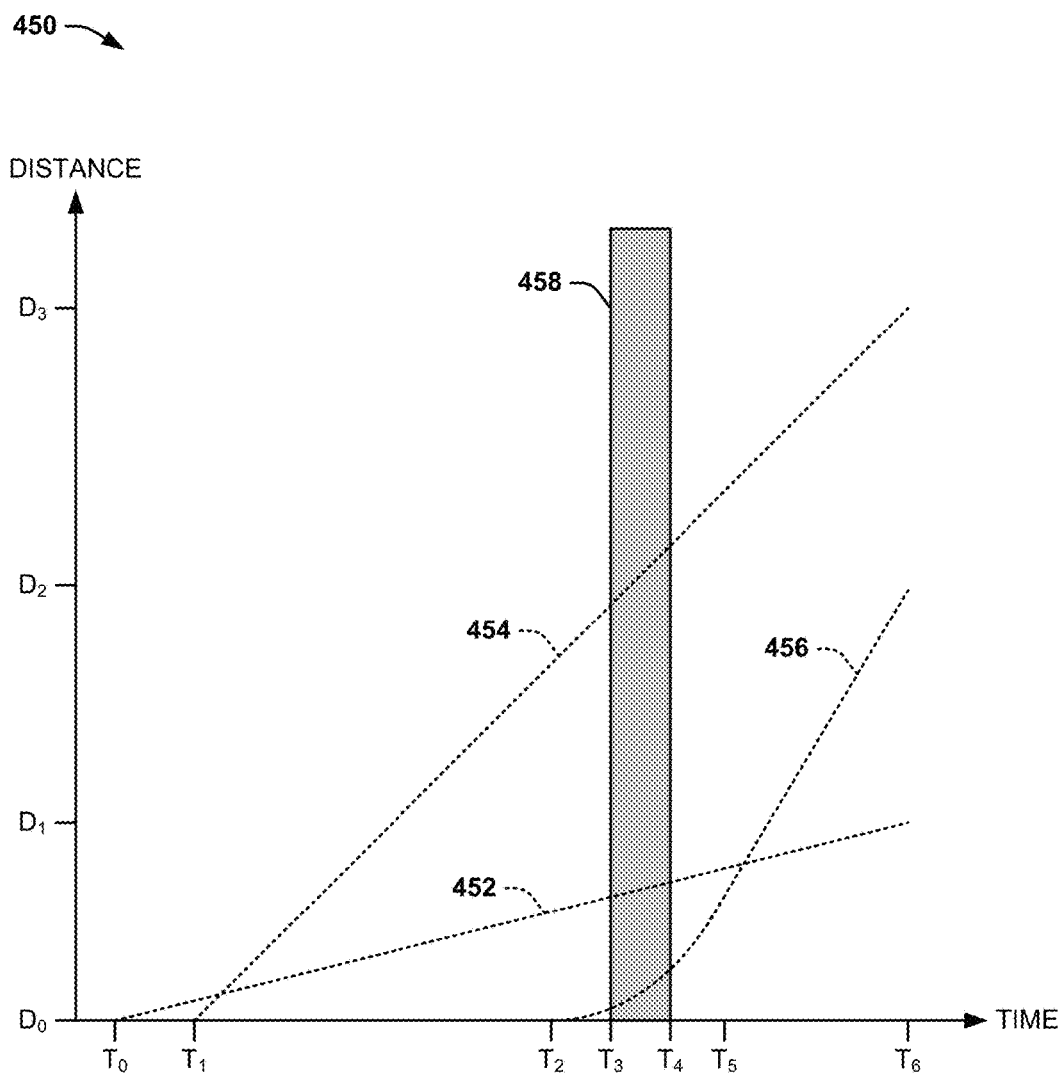
FIG. 10 illustrates an example of a graph of location as a function of time for determining velocity.

FIG. 10 illustrates an example of a graph 450 of location on a Y-axis as a function of time on an X-axis for determining velocity. The graph 450 can correspond to a graph that is compiled by or otherwise associated with the operation of the velocity calculator 20 in the example of FIG. 1. Therefore, reference is to be made to the example of FIGS. 1-8 in the following description of the example of FIG. 10.

The graph 450 demonstrates statistical lines associated with each of four moving targets, with each of the statistical lines being associated with a set of time-sampled location indicators over a duration of time, such as saved in the memory 12. In the example of FIG. 10, the graph 450 demonstrates a first statistical line 452, a second statistical line 454, and a third statistical line 456 that each correspond to respective moving targets. The first statistical line 452 is associated with time-sampled location indicators that have been collected starting at a time $T_o$, the second statistical line 454 is associated with time-sampled location indicators that have been collected starting at a time $T_1$, and the statistical line 456 is associated with time-sampled location indicators that have been collected starting at a time $T_2$, with each of the statistical lines 452, 454, and 456 demonstrating movement of the respective moving targets up to a time $T_6$ (e.g., a most recent sampling time). The first statistical line 452 demonstrates movement of the moving target from a distance $D_0$ to a distance $D_1$ in the duration between the times $T_0$ and $T_6$, the second statistical line 454 demonstrates movement of the moving target from the distance $D_0$ to a distance $D_3$ in the duration between the times $T_1$ and $T_6$, and the statistical line 456 demonstrates movement of the moving target from the distance $D_0$ to a distance $D_2$ in the duration between the times $T_2$ and $T_6$.

As an example, the velocity calculator 20 can be configured to calculate a velocity of each of the moving targets represented by the statistical lines 452, 454, and 456 based on a slope of each of the statistical lines 452, 454, and 456. For example, as described herein, the velocity calculator 20 can be configured to calculate a velocity of the moving targets based on a difference between consecutive respective time-sampled location indicators of the respective moving targets with respect to the height and with respect to the location of the moving targets. Therefore, the slopes of the respective statistical lines 452, 454, and 456 can correspond to respective velocities of the moving targets. As demonstrated in the example of FIG. 10, the statistical line 452 is demonstrated as having a least slope to indicate that the moving target associated with the statistical line 452 is traveling at a lesser velocity than the moving targets associated with the statistical lines 454 and 456. On the contrary, the statistical line 456 is demonstrated as having a greatest slope to indicate that the moving target associated with the statistical line 456 is traveling at a greater velocity than the moving targets associated with the statistical lines 452 and 454. In the example of FIG. 10, the moving target associated with the statistical line 456 is demonstrated as having a variable slope from the time $T_2$ to a time $T_5$ to demonstrate acceleration of the moving target between the time $T_0$ to the time $T_5$. The velocity calculator 20 could likewise be configured to calculate the acceleration in the manner described herein.

The graph 450 also demonstrates a user-defined sampling window 458 between times $T_3$ and $T_4$. As an example, the times $T_3$ and $T_4$ can correspond to previous times that the user of the MTI system 10 specified to request a velocity calculation of the moving vehicles therein via the velocity calculator 20. For example, the user can specify the start time $T_3$ and the end time $T_4$ of the sampling window to define a duration of the sampling window 458. As an example, the start time $T_3$ and the end time $T_4$ can be times that are previous to any of the sampling times associated with the moving target indicators having been superimposed on the geography data at the most recent sampling time, and can thus correspond to previous sampling times that are no longer relevant to the generation of moving target indicators at the most recent sampling time. Thus, in response to creation of the sampling window 458, the velocity calculator 20 can be configured to access the time-sampled location indicators associated with one or more of the moving vehicles in the composite image IMG associated with the sampling times encapsulated by the sampling window 458. Therefore, the velocity calculator 20 can calculate velocities associated with one or more of the moving targets in the composite image IMG during the time duration defined by the sampling window 458 in a retroactive manner based on the time-sampled location indicators stored in the memory 12.

Figure 11:
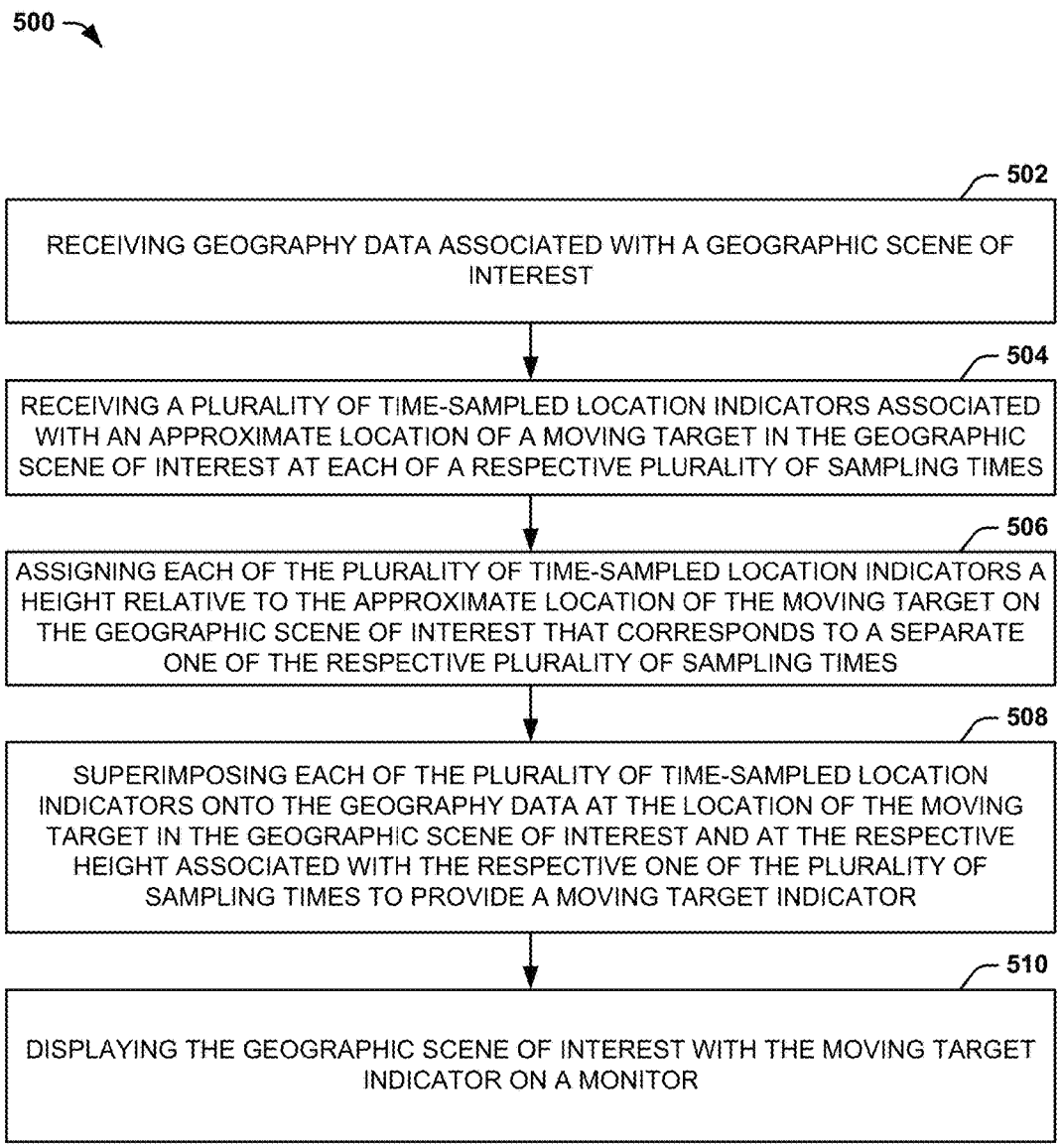
FIG. 11 illustrates an example of a method for generating a moving target indicator.

In view of the foregoing structural and functional features described above, a methodology in accordance with various aspects of the present invention will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 11 illustrates an example of a method 500 for providing moving target indication (MTI). At 502, geography data (e.g., the geography data GEO) associated with a geographic scene of interest is received. At 504, a plurality of time-sampled location indicators (e.g., the time-sampled location indicators TSPI) associated with an approximate location of a moving target (e.g., the moving target 54) in the geographic scene of interest is received at each of a respective plurality of sampling times (e.g., the sampling times $T_0$ through $T_5$). At 506, each of the plurality of time-sampled location indicators is associated with a height (e.g., the heights $H_0$ through $H_5$) relative to the approximate location of the moving target on the geographic scene of interest that corresponds to a separate one of the respective plurality of sampling times. At 508, each of the plurality of time-sampled location indicators is superimposed onto the geography data at the location of the moving target in the geographic scene of interest and at the respective height associated with the respective one of the plurality of sampling times to provide a moving target indicator (e.g., the moving target indicator 52 represented by the time-sampled location indicators 56, 58, 60, 62, 64, and 66). At 510, the geographic scene of interest with the moving target indicator is displayed on a monitor (e.g., the monitor 16).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A moving target indication (MTI) system comprising:
    an MTI data processor that receives time-sampled location indicators associated with an approximate location of a moving target in a geographic scene of interest and to generate a moving target indicator associated with the moving target based on the time-sampled location indicators;
    a memory that stores the time-sampled location indicators;
    an image integrator that receives the moving target indicator associated with the moving target, that receives image data associated with the geographic scene of interest, and that superimposes the moving target indicator onto the image data as a three-dimensional moving target indicator at an approximate geographic location of the moving target; and
    a monitor that displays the three-dimensional moving target indicator superimposed on the image data at the approximate geographic location of the moving target,
    wherein the time-sampled location indicators that each correspond to the location of the moving target in the geographic scene of interest at each of a respective plurality of sampling times, each of the set of the time-sampled location indicators having a height relative to the location of the moving target on the geographic scene of interest that corresponds to a separate one of the respective plurality of sampling times.

2. The system of claim 1, wherein the image integrator is configured to demonstrate motion of the moving target on the monitor via the moving target indicator based on generating a new time-sampled location indicator and repositioning the height of each of the remaining at least one of the plurality of time-sampled location indicators at each of the respective plurality of sampling times.

3. The system of claim 1, wherein a respective one of the set of the time-sampled location indicators associated with a most recent of the respective plurality of sampling times is displayed in a visual manner that is distinct relative to the remaining at least one of the time-sampled location indicators associated with the moving target indicator.

4. The system of claim 3, wherein the respective one of the set of the time-sampled location indicators associated with the most recent one of the respective plurality of sampling times is displayed as at least one of larger and a different color relative to the remaining at least one of the plurality of time-sampled location indicators associated with the moving target indicator.

5. The system of claim 1, wherein the height of the set of the time-sampled location indicators associated with the moving target indicator is one of ascending and descending with respect to consecutive ones of the set of the time-sampled location indicators.

6. The system of claim 5, further comprising a velocity calculator configured to calculate a velocity of the moving target based on a difference between the consecutive ones of the respective set of the time-sampled location indicators with respect to the height and with respect to the location of the moving target.

7. The system of claim 6, wherein the velocity calculator is configured to graph a statistical line of distance moved of the moving target relative to time based on the difference between the consecutive ones of the respective set of the time-sampled location indicators with respect to the height and with respect to the location of the moving target and to calculate the velocity of the moving target based on a slope of the statistical line.

8. The system of claim 6, further comprising a memory configured to store the time-sampled location indicators associated with the moving target, wherein the velocity calculator is configured enable a user to define a sampling window associated with a predetermined previous time duration to calculate the velocity of the moving target during the sampling window based on the time-sampled location indicators stored in the memory that are associated with the sampling window.

9. The system of claim 8, wherein the memory is configured to store time-sampled location indicators associated with a plurality of moving targets, wherein the velocity calculator is configured to calculate a relative velocity of each of the plurality of moving targets based on the time-sampled location indicators associated with each of the plurality of moving targets.

10. The system of claim 1, wherein the MTI data processor is configured to receive the time-sampled location indicators via a radar system.

11. A computer readable medium configured to store instructions that, when executed, implement a method for providing moving target indication (MTI), the method comprising:
receiving geography data associated with a geographic scene of interest;
receiving a plurality of time-sampled location indicators associated with an approximate location of a moving target in the geographic scene of interest at each of a respective plurality of sampling times;
storing the plurality of time-sampled location indicators in a memory;
assigning each of the plurality of time-sampled location indicators that correspond to the location of the moving target a height relative to the approximate location of the moving target on the geographic scene of interest that corresponds to a separate one of the respective plurality of sampling times;
superimposing each of the plurality of time-sampled location indicators onto the geography data at the location of the moving target in the geographic scene of interest and at the respective height associated with the respective one of the plurality of sampling times to provide a moving target indicator; and
displaying the geographic scene of interest with the moving target indicator on a monitor.

12. The medium of claim 11, wherein assigning each of the plurality of time-sampled location indicators comprises arranging the height of consecutive ones of the plurality of time-sampled location indicators associated with the moving target indicator as one of ascending and descending.

13. The medium of claim 11, further comprising:
graphing a statistical line of distance moved of the moving target relative to time based on the difference between the consecutive ones of a set of the respective plurality of time-sampled location indicators with respect to the height and with respect to the approximate location of the moving target; and
calculating a velocity of the moving target based on a slope of the statistical line.

14. The medium of claim 11, wherein receiving the geography data comprises receiving the geography data as image data, and wherein receiving the plurality of time-sampled location indicators comprises receiving the plurality of time-sampled location indicators via a radar system.

15. The medium of claim 11, wherein assigning each of the plurality of time-sampled location indicators comprises:
assigning a first of the plurality of time-sampled location indicators associated with the approximate location of the moving target in the geographic scene of interest at a most recent of the plurality sampling times at a first height at each sampling time; and
repositioning the height of each of a remaining at least one of the plurality of time-sampled location indicators associated with each of the respective plurality of previous sampling times at each sampling time to demonstrate motion of the moving target.

16. A moving target indication (MTI) system comprising:
an MTI data processor that receives time-sampled location indicators associated with an approximate location of a moving target in a geographic scene of interest at each of respective sampling times via a radar system and that generates a moving target indicator associated with the moving target based on the time-sampled location indicators, the moving target indicator comprising a set of the time-sampled location indicators that each correspond to the approximate location of the moving target in the geographic scene of interest at each of the respective sampling times, the MTI data processor further assigns each of the set of the time-sampled location indicators associated with the moving target indicator a height relative to the approximately location of the moving target on the geographic scene of interest that corresponds to a separate one of the respective sampling times;
a memory that stores the time-sampled location indicators;
an image integrator that receives the moving target indicator associated with the moving target, that receives image data associated with the geographic scene of interest, and that superimposes the moving target indicator into the geography data as a three-dimensional moving target indicator at an approximate geographic location of the moving target; and
a monitor that displays the three-dimensional moving target indicator superimposed on the image data at the approximate geographic location of the moving target.

17. The system of claim 16, further comprising a velocity calculator configured to graph a statistical line of distance moved of the moving target relative to time based on the difference between the consecutive ones of the respective set of the time-sampled location indicators with respect to the height and with respect to the approximate location of the moving target and to calculate the velocity of the moving target based on a slope of the statistical line.

* * * * *